(12) United States Patent
Shao et al.

(10) Patent No.: US 10,541,425 B2
(45) Date of Patent: Jan. 21, 2020

(54) METHOD AND SYSTEM FOR CORE-SHELL CATALYST PROCESSING

(71) Applicant: Audi AG, Ingolstadt (DE)

(72) Inventors: Minhua Shao, Farmington, CT (US); John W. Weidner, Elgin, SC (US); Jonathan H. Odell, Agawam, MA (US)

(73) Assignee: AUDI AG, Ingolstadt (DE)

( * ) Notice: Subject to any disclaimer, the term of this patent is extended or adjusted under 35 U.S.C. 154(b) by 205 days.

(21) Appl. No.: 14/904,679

(22) PCT Filed: Jul. 19, 2013

(86) PCT No.: PCT/US2013/051200
§ 371 (c)(1),
(2) Date: Jan. 12, 2016

(87) PCT Pub. No.: WO2015/009311
PCT Pub. Date: Jan. 22, 2015

(65) Prior Publication Data
US 2016/0172685 A1 Jun. 16, 2016

(51) Int. Cl.
*H01M 4/88* (2006.01)
*H01M 4/90* (2006.01)
*H01M 4/92* (2006.01)

(52) U.S. Cl.
CPC ....... *H01M 4/8825* (2013.01); *H01M 4/9075* (2013.01); *H01M 4/92* (2013.01)

(58) Field of Classification Search
CPC .... H01M 4/8657; H01M 4/921; H01M 4/926; H01M 4/8825; H01M 4/9075; H01M 4/92; H01M 4/8853; B22F 1/0018; B22F 1/025; C25D 17/12; C25D 7/006; C25D 17/16; C23C 18/54; B82Y 30/00
See application file for complete search history.

(56) References Cited

U.S. PATENT DOCUMENTS

| | | | |
|---|---|---|---|
| 9,484,582 | B2 | 11/2016 | Marzullo et al. |
| 9,610,566 | B2 | 4/2017 | Shao et al. |
| 2003/0017378 | A1 | 1/2003 | Ruth et al. |
| 2006/0135359 | A1 | 6/2006 | Adzic et al. |

(Continued)

FOREIGN PATENT DOCUMENTS

| | | |
|---|---|---|
| EP | 0 171 478 A2 | 2/1986 |
| EP | 2 308 596 A1 | 4/2011 |

(Continued)

*Primary Examiner* — Robert S Walters, Jr.
(74) *Attorney, Agent, or Firm* — Seed Intellectual Property Law Group LLP

(57) ABSTRACT

According to an embodiment, a method of processing a material for a catalyst includes establishing an electrical potential on a porous electrode. Core particles are directed through the porous electrode. A layer of metal is deposited on the core particles as the particles pass through the porous electrode. According to an embodiment, an example assembly for processing a material for a catalyst includes a housing that establishes a path for particles to move through the housing. A porous electrode is situated within the housing for permitting core particles to move through the porous electrode. A layer of metal can be deposited on the core particles as the particles pass through the porous electrode.

11 Claims, 2 Drawing Sheets

(56) References Cited

U.S. PATENT DOCUMENTS

| | | | |
|---|---|---|---|
| 2007/0129247 A1 | 6/2007 | Chigapov et al. | |
| 2008/0081017 A1 | 4/2008 | Zhou et al. | |
| 2008/0200741 A1 | 8/2008 | Kowaleski | |
| 2012/0010069 A1 | 1/2012 | Takehiro et al. | |
| 2012/0245017 A1 | 9/2012 | Adzic et al. | |
| 2012/0258854 A1 | 10/2012 | Kawamura et al. | |
| 2012/0316060 A1 | 12/2012 | Shao et al. | |
| 2012/0329642 A1 | 12/2012 | Shao | |
| 2013/0034803 A1 | 2/2013 | Adzic et al. | |
| 2013/0324394 A1 | 12/2013 | Shao et al. | |
| 2013/0340915 A1* | 12/2013 | Shao | H01M 4/8663 156/60 |

FOREIGN PATENT DOCUMENTS

| | | | | |
|---|---|---|---|---|
| JP | 63-162896 A | 7/1988 | | |
| JP | 2002-069689 A | 3/2002 | | |
| JP | 2008-297574 A | 12/2008 | | |
| JP | 2009-504914 A | 2/2009 | | |
| JP | 2014-128756 A | 7/2014 | | |
| WO | 2011/119818 A1 | 9/2011 | | |
| WO | WO 2012/115624 | * | 8/2012 | B01J 23/89 |
| WO | 2013/024305 A2 | 2/2013 | | |

* cited by examiner

METHOD AND SYSTEM FOR CORE-SHELL CATALYST PROCESSING

BACKGROUND

Fuel cells are useful for producing electrical energy based on an electrochemical reaction. One of the challenges associated with implementing fuel cells on a large scale has been the expense typically associated with the fuel cell components. For example, catalyst layers typically include expensive materials such as platinum. There have been various proposals for reducing the amount of platinum required to reduce the cost associated with fuel cells.

One proposal has been to use core-shell catalysts including a noble metal core with a shell of platinum deposited on the core. Such core-shell catalyst are considered promising for low temperature fuel cells, for example. Synthesizing core-shell catalysts according to some proposals includes establishing a copper monolayer on a palladium (or other noble metal) core and subsequently displacing the copper with a monolayer of platinum. Some of the challenges associated with proposed techniques in this regard include avoiding platinum cluster formation during the deposition process to achieve a platinum monolayer having desired characteristics. The type of constraints required to control the platinum deposition process tend to limit the batch size and that may detract from any economic benefits associated with utilizing core-shell catalysts.

SUMMARY

According to an embodiment, a method of processing a material for a catalyst includes establishing an electrical potential on a porous electrode. Core particles are directed through the porous electrode. A layer of metal is deposited on the core particles as the particles pass through the porous electrode.

According to an embodiment, an example assembly for processing a material for a catalyst includes a housing that establishes a path for particles to move through the housing. A porous electrode is situated within the housing for permitting a dispersion of core particles to move through the porous electrode. A layer of metal can be deposited on the core particles as the particles pass through the porous electrode.

The various features and advantages of at least one disclosed embodiment will become apparent to those skilled in the art from the following detailed description. The drawings that accompany the detailed description can be briefly described as follows.

DETAILED DESCRIPTION

Figure 1:
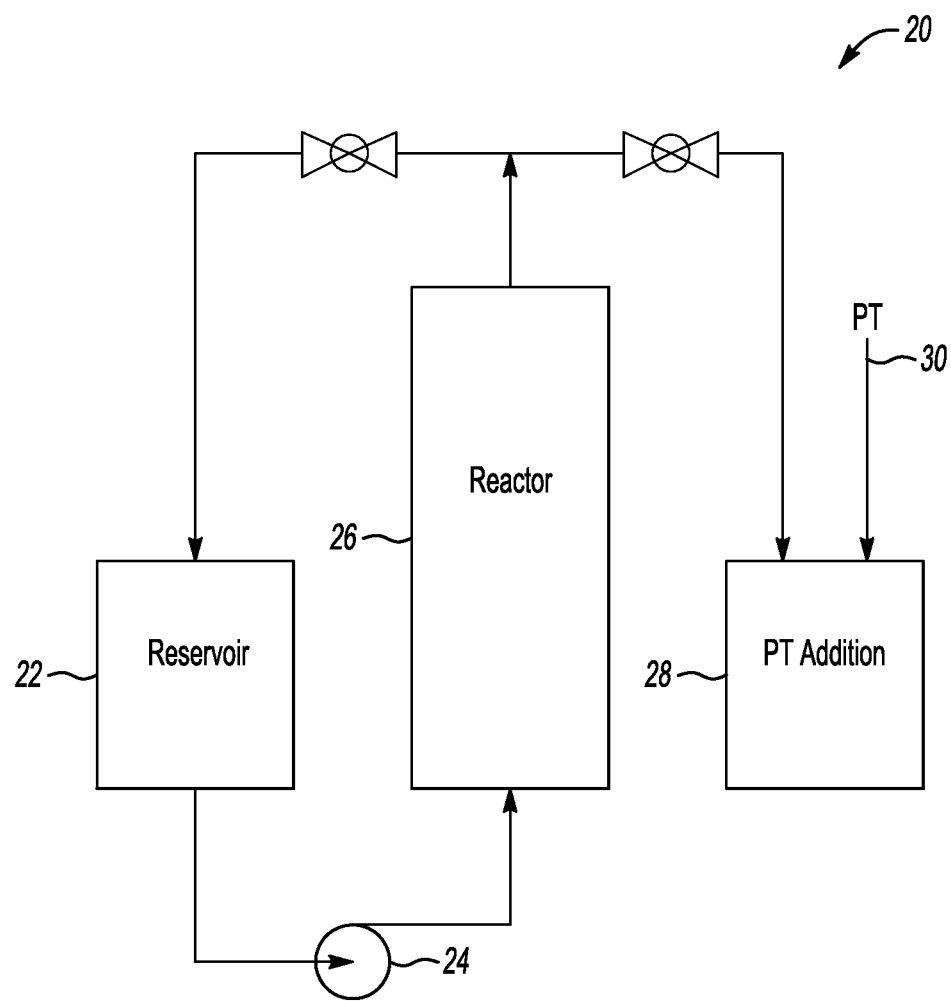
FIG. 1 schematically illustrates a system configured for performing a method of processing a material for a catalyst according to an embodiment of this invention.

FIG. 1 schematically illustrates a system 20 that is configured for performing a method of processing a material for a catalyst. The system 20 is useful for realizing core-shell catalysts that include a platinum monolayer over a shell of a noble metal, such as palladium. The system 20 includes a reservoir 22 that includes a solution of core particles, copper sulfate and hydrogen sulfate ($CuSO_4+H_2SO_4$). The solution within the reservoir 22 also includes core particles of a selected noble metal, such as palladium. In one example, the solution within the reservoir 22 includes a concentration of 0.05 M copper sulfate and 0.05 M hydrogen sulfate.

In some examples, the core particles comprise palladium or a selected noble metal. In one embodiment, the core particles comprise palladium nanoparticles supported on carbon particles.

A pump 24 directs the solution from the reservoir 22 into a reactor 26 where a copper monolayer is deposited on the core particles. Once the copper monolayer has been deposited on the core particles they are directed to a replacement chamber 28 where the copper monolayer is replaced with a platinum monolayer.

The reaction for replacing the copper monolayer with the platinum monolayer in the illustrated example occurs in a generally known manner. For example, a solution provided at 30 includes $K_2PtCl_4+H_2SO_4$ plus an additive, such as citric acid and citrate. In one example, the $K_2PtCl_4$ has a concentration of 0.001 M, the $H_2SO_4$ has a concentration of 0.05 M and the additive concentration is more than ten times higher than that of $K_2PtCl_4$. The reaction within the replacement chamber 28 may be summarized as $Cu+Pt^{2+}=Cu^{2+}+Pt$.

Figure 2:
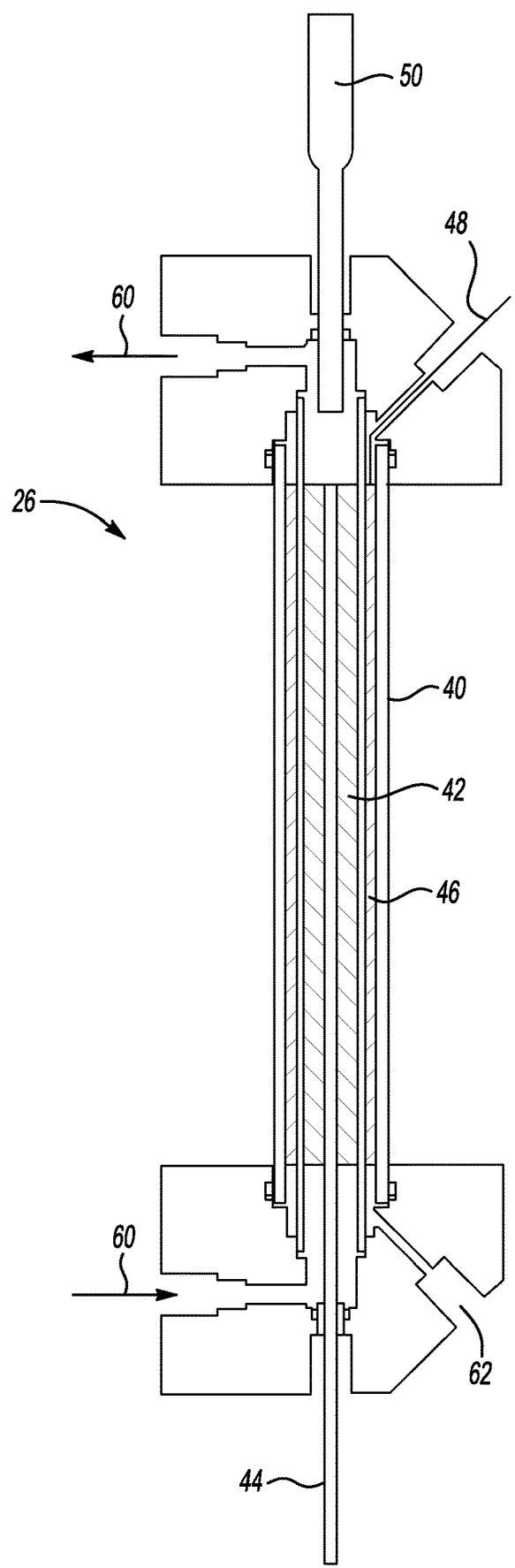
FIG. 2 schematically illustrates an example reactor including a porous electrode according to an embodiment of this invention.

The reactor 26 is configured to facilitate a scaled-up process of achieving a platinum monolayer on a core-shell catalyst. As shown in FIG. 2, the reactor 26 includes a housing 40, such as a glass tube. A porous working electrode 42 is electrically charged and associated with an electrically conductive lead 44. The porous electrode 42 is situated within the housing 40. The porous electrode 42 comprises a carbon matrix or lattice structure in this example. Those skilled in the art who have the benefit of this description will realize how to configure a porous carbon matrix that allows a solution including the core particles to pass through the porous working electrode 42 as the solution moves through the reactor 26.

Another porous tube 46 is situated within the housing 40. The porous tube 46 serves as a counter electrode associated with an electrically conductive lead 48. A reference electrode 50 is provided in this example. The electrodes facilitate depositing a monolayer of copper on the core particles. As the solution including the core particles moves through the porous working electrode 42, contact between the porous carbon matrix and the particles provides the potential for depositing copper onto the particles. In one example, the core particles comprise carbon with palladium supported on the carbon. The solution including the core particles flows through the reactor 26 as schematically shown at 60. The porous electrode 42 has a length along the direction of flow through the reactor 26 that facilitates establishing a uniform monolayer of copper on the core articles.

The illustrated example includes a drain 62 to facilitate removing any fluid from the reactor 26 as may be required.

One feature of the porous working electrode 42 is that it facilitates achieving a copper monolayer on the core particles in large batch quantities. While previous proposed arrangements for plating catalyst core particles with a monolayer of copper may have yielded results measured in grams, the illustrated reactor 26 yields results measured in kilograms. In other words, the porous electrode reactor configuration makes it possible to increase production quantities by 1,000 times that which may have been expected using other copper deposition equipment or techniques.

The disclosed example reactor configuration enhances the economies associated with utilizing core-shell catalyst materials. The ability to realize large-scale production renders core-shell catalysts an even more promising substitute for pure platinum for manufacturing catalysts for use in fuel cells or other electrochemical-based energy producing devices.

The preceding description is illustrative rather than limiting in nature. Variations and modifications to the disclosed examples may become apparent to those skilled in the art that do not necessarily depart from the essence of the contribution to the art provided by the disclosed example. The scope of legal protection provided to the invention can only be determined by studying the following claims.

We claim:

1. A method of processing a material for a catalyst, comprising:
    establishing an electrical potential on a porous electrode;
    directing core particles through the porous electrode;
    depositing a layer of metal on the core particles as the particles pass through the porous electrode;
    mixing the core particles having the deposited layer of metal with a solution including $K_2PtCl_4$, citric acid and citrate; and
    replacing the deposited layer of metal with platinum to thereby establish a platinum monolayer on the core particles,
    the concentration of citric acid and citrate together is greater than 10 times the concentration of the $K_2PtCl_4$ in the solution;
    the porous electrode has a length along a direction that the core particles travel as the core particles pass through the porous electrode; and
    the length is selected to facilitate depositing a uniform monolayer of the metal on the core particles.

2. The method of claim 1, wherein contact between the core particles and the porous electrode facilitates the depositing.

3. The method of claim 1, wherein the core particles comprise palladium; and the layer of metal comprises copper.

4. The method of claim 3, wherein the core particles comprise palladium nanoparticles supported on carbon particles.

5. The method of claim 1, wherein the layer of metal comprises a monolayer of copper.

6. The method of claim 1, wherein the porous electrode comprises carbon.

7. An assembly for processing a material for a catalyst, the assembly comprising:
    a housing that establishes a path for core particles to move through the housing; a porous electrode situated within the housing for permitting core particles to move through the porous electrode whereby a layer of metal can be deposited on the core particles as the core particles pass through the porous electrode; and
    a replacement chamber comprising a solution including $K_2PtCl_4$, citric acid and citrate, the replacement chamber providing a reservoir for mixing the core particles having a layer of metal deposited with the solution thereby replacing the deposited layer of metal with platinum to establish a platinum monolayer on the core particles,
    the concentration of citric acid and citrate together is greater than 10 times the concentration of the $K_2PtCl_4$ in the solution;
    the porous electrode has a length along a direction that the core particles travel as the core particles pass through the porous electrode; and
    the length is selected to facilitate depositing a uniform monolayer of the metal on the core particles.

8. The assembly of claim 7, wherein the core particles comprise palladium; and the layer of metal comprises copper.

9. The assembly of claim 8, wherein the core particles comprise palladium nanoparticles supported on carbon particles.

10. The assembly of claim 7, wherein the porous electrode comprises carbon.

11. The assembly of claim 7, wherein the metal layer comprises a monolayer of copper.

* * * * *